(12) United States Patent
Wright et al.

(10) Patent No.: US 9,302,950 B2
(45) Date of Patent: Apr. 5, 2016

(54) COMPOSTING CONTAINER

(71) Applicant: Toter, LLC, Charlotte, NC (US)

(72) Inventors: Todd E. Wright, Statesville, NC (US); Joseph M. Lehman, New Albany, OH (US); Shannon Douglas Staats, Ostrander, OH (US); Paul Perry Kolada, Bexley, OH (US); Chad Michael Leeder, Orrville, OH (US); Eric James Fickas, Powell, OH (US); John Tarlton Ford, Charlotte, NC (US)

(73) Assignee: TOTER, LLC, Charlotte, NC (US)

( * ) Notice: Subject to any disclaimer, the term of this patent is extended or adjusted under 35 U.S.C. 154(b) by 150 days.

(21) Appl. No.: 13/935,839

(22) Filed: Jul. 5, 2013

(65) Prior Publication Data
US 2014/0017777 A1   Jan. 16, 2014

Related U.S. Application Data

(60) Provisional application No. 61/669,912, filed on Jul. 10, 2012.

(51) Int. Cl.
*C05F 17/02* (2006.01)

(52) U.S. Cl.
CPC .......... *C05F 17/0205* (2013.01); *Y02P 20/145* (2015.11); *Y02W 30/43* (2015.05)

(58) Field of Classification Search
CPC ... C05F 17/0205; Y02W 30/43; Y02P 20/145
See application file for complete search history.

(56) References Cited

U.S. PATENT DOCUMENTS

| | | | |
|---|---|---|---|
| 4,287,064 A * | 9/1981 | Ando et al. | 210/413 |
| 4,687,645 A | 8/1987 | Harvey | |
| 5,156,290 A | 10/1992 | Rodrigues | |
| 5,185,261 A | 2/1993 | Warrington | |
| 5,339,974 A * | 8/1994 | Raghunathan | 220/4.26 |
| 5,433,524 A * | 7/1995 | Wuester | 366/244 |
| 5,545,559 A | 8/1996 | Kariniemi | |
| 6,029,918 A | 2/2000 | Sundberg | |
| 6,482,627 B1 | 11/2002 | Dahlstrom | |
| 6,518,057 B2 | 2/2003 | Morrison | |
| 6,921,661 B2 | 7/2005 | Nagy et al. | |
| 6,951,254 B2 | 10/2005 | Morrison | |

(Continued)

FOREIGN PATENT DOCUMENTS

| | | |
|---|---|---|
| DE | 3802499 | 12/1988 |
| EP | 1118604 | 7/2001 |
| WO | 2009/158692 | 12/2009 |

OTHER PUBLICATIONS

Aerobin, The Waste Revolution for Modern Living, 8 pages printed from the world wide web on Aug. 1, 2011.

(Continued)

*Primary Examiner* — Gautam Prakash
(74) *Attorney, Agent, or Firm* — Nelson Mullins Riley & Scarborough LLP

(57) ABSTRACT

The invention is generally applicable to a composting container. More specifically, a compositing container is provided that includes a body defining a cavity for receiving material to be composted and an agitator mechanism for agitating or otherwise moving, stirring, shifting, disturbing, disrupting or displacing the material in the cavity. In various additional embodiments, a grating is situated in the cavity that divides the cavity into an upper portion and a lower portion.

20 Claims, 10 Drawing Sheets

(56) References Cited

U.S. PATENT DOCUMENTS

| | | |
|---|---|---|
| 7,611,891 B2 | 11/2009 | Sundberg |
| 7,867,759 B2 | 1/2011 | Teixeira |
| 7,989,200 B2 | 8/2011 | Morrison |
| 2008/0213876 A1 | 9/2008 | Morrison |
| 2008/0264128 A1 | 10/2008 | Morrison |
| 2009/0325281 A1 | 12/2009 | Stanford et al. |
| 2010/0193534 A1* | 8/2010 | Roberts et al. ............... 220/810 |
| 2011/0151553 A1 | 6/2011 | Cruson et al. |
| 2011/0244560 A1 | 10/2011 | Morrison |
| 2012/0021504 A1* | 1/2012 | Bradlee ................ 435/290.4 |

OTHER PUBLICATIONS

Aerobin, 400 Composter, 6 pages printed from the world wide web on Aug. 1, 2011.

* cited by examiner

COMPOSTING CONTAINER

RELATED APPLICATION

This application is a U.S. Non-Provisional patent application which claims priority to U.S. Provisional Patent Application Ser. No. 61/669,912, filed on Jul. 10, 2012 and titled "COMPOSTING CONTAINER," which is hereby incorporated by reference in its entirety.

TECHNICAL FIELD

The general inventive concepts relate generally to containers and, more specifically, to composting containers.

BACKGROUND

The decomposition of organic matter into compost is well known. Such compost is often useful as a fertilizer or soil additive. Composting is also beneficial as a natural, environmentally friendly means of recycling or otherwise reusing certain waste vegetation and foods. Accordingly, there is a general need for containers that facilitate the effective composting of organic matter.

SUMMARY

The general inventive concepts contemplate containers that are designed to simply and effectively facilitate the decomposition of organic matter into compost.

In one exemplary embodiment, a compositing container includes a body defining a cavity for receiving material to be composted; a lid for covering an opening in the body exposing the cavity; and an agitator mechanism for agitating or otherwise moving, stirring, shifting, disturbing, disrupting or displacing the material in the cavity.

In one exemplary embodiment, a compositing container includes a body defining a cavity for receiving material to be composted; a lid for covering an opening in the body exposing the cavity; and an agitator mechanism for agitating the material in the cavity that includes a handle; a base having at least one brush thereon; and a shaft connecting the handle to the base. The agitator mechanism is at least partially disposed within the cavity, and movement of the handle causes the base to move within the cavity. In one exemplary embodiment, rotation of the handle causes the base to rotate.

In one exemplary embodiment, the composting container further includes a grating situated in the cavity, wherein the grating divides the cavity into an upper portion and a lower portion.

In one exemplary embodiment, the agitator mechanism is disposed in the cavity and helps to urge or otherwise facilitate the movement of all or a portion of the material from the upper portion of the cavity through the grate when desired by a user (e.g., when the material has resided within the upper portion of the container for a desired duration to be decomposed sufficiently and converted to compost).

In one exemplary embodiment, the agitator mechanism includes a handle; a base having at least one brush thereon; and a shaft connecting the handle to the base. At least a portion of the brush of the agitator mechanism contacts the grating and/or extends through the grating and into the upper portion of the cavity. In such exemplary embodiments, the movement of the agitator mechanism relative to the grating serves to urge or otherwise facilitate the movement of all or a portion of the material from the upper portion of the cavity through the grate when desired by a user.

In one exemplary embodiment, the composting container further includes a stack, pillar or similar structure that includes a plurality of apertures.

In one exemplary embodiment, the composting container further a stack, pillar or similar structure that at least partially encloses the agitator mechanism. In one exemplary embodiment, the stack includes a plurality of tiers.

In one exemplary embodiment, the body includes a handle portion. The handle portion, for example, allows a user to grab and/or hold onto the container. In one exemplary embodiment, the lid is pivotably attached to the handle portion of the body.

In one exemplary embodiment, the body includes a lid latch or other securing device for securing the lid in a closed position.

In one exemplary embodiment, the composting container further includes at least one wheel attached to the body. The at least one wheel, for example, facilitates movement of the container.

In one exemplary embodiment, an upper surface of the body surrounding the opening includes a plurality of recesses, wherein the recesses remain exposed to ambient air when the lid covers the opening in the body and provide a passageway for ambient air to enter the cavity within the composting container when the lid covers the opening.

In one exemplary embodiment, an inner surface of the body includes a plurality of grooves. In one exemplary embodiment, at least a first portion of each groove is located in the upper portion of the cavity and at least a second portion of each groove is located in the lower portion of the cavity.

In one exemplary embodiment, the body has a plurality of apertures formed therein.

In one exemplary embodiment, the container further includes a lower door for covering a lower opening in the body exposing the lower portion of the cavity. In one exemplary embodiment, the body includes a door latch for securing the lower door in a closed position.

In one exemplary embodiment, a compositing container includes a body defining a cavity for receiving material to be composted; a lid for covering an opening in the body exposing the cavity; an agitator mechanism for agitating the material in the cavity, a grating situated in the cavity, said grating dividing the cavity into an upper portion and a lower portion; a stack which extends between the opening in the body and the grating; a lower door for covering a lower opening exposing the lower portion of the cavity; a container handle; and a pair of wheels which facilitate movement of the container. In one exemplary embodiment, the stack at least partially encloses the agitator mechanism. In one exemplary embodiment, the agitator mechanism includes a handle; a base; a pair of brushes, with each brush being disposed on an opposite end of the base; and a shaft connecting the handle to the base. Movement of the handle causes the base to move within the cavity. In one exemplary embodiment, rotation of the handle causes the base and brushes to rotate.

In one exemplary embodiment, the agitator mechanism is entirely disposed within the cavity. In one exemplary embodiment, the base of the agitator mechanism is located in the lower portion of the cavity, such that at least a portion of the at least one brush contacts the grating and/or extends through the grating and into the upper portion of the cavity.

In one exemplary embodiment, an upper surface of the body surrounding the opening includes a plurality of recesses, wherein the recesses remain exposed to ambient air when the lid covers the opening in the body and provide a passageway for ambient air to enter the cavity within the composting container when the lid covers the opening.

In one exemplary embodiment, an inner surface of the body includes a plurality of grooves. In one exemplary embodiment, at least a first portion of each groove is located in the upper portion of the cavity and at least a second portion of each groove is located in the lower portion of the cavity.

In one exemplary embodiment, the body has a plurality of apertures formed therein.

Various exemplary features and advantages of the general inventive concepts will be set forth in part in the description which follows, and in part will be obvious from the description, or may be readily learned by practice of the general inventive concepts. The accompanying drawings, which are incorporated in and constitute a part of the instant application, illustrate one or more embodiments exemplifying the general inventive concepts, and together with the description, serve to explain the principles of the general inventive concepts.

DETAILED DESCRIPTION

Figure 1A:
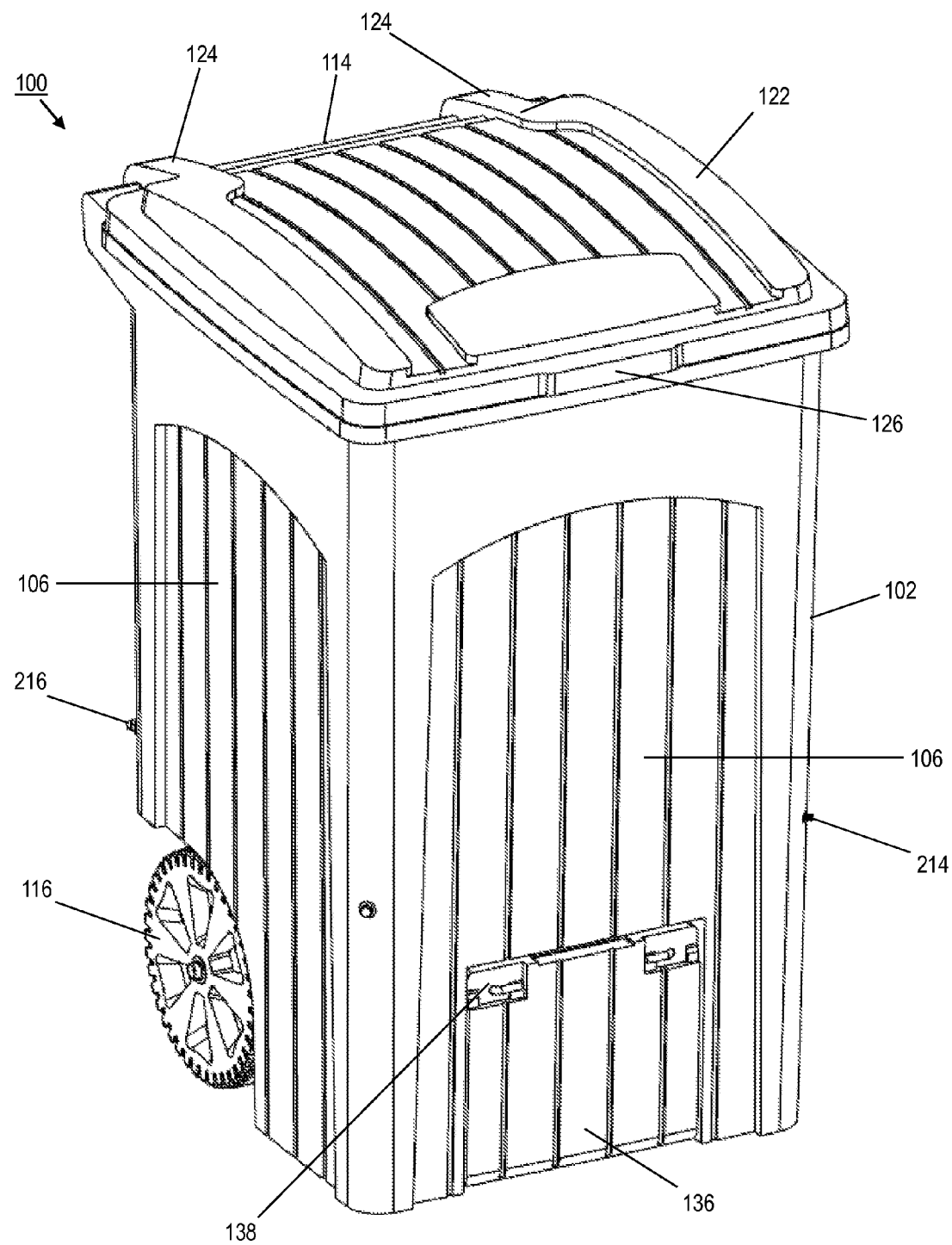
FIG. 1A shows a perspective view of one exemplary, non-limiting embodiment of a composting container, with a lid of the container in a closed position.

The general inventive concepts will now be described with reference to specific embodiments thereof. The general inventive concepts may, however, be embodied in different forms and should not be construed as limited to the embodiments set forth herein. Rather, these exemplary embodiments are provided to facilitate disclosure of the general inventive concepts to those skilled in the art and are not intended to limit the scope of the general inventive concepts in any way.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the general inventive concepts, the singular forms "a," "an," and "the" are intended to include the plural forms as well, unless the context clearly indicates otherwise.

Unless otherwise indicated, all numbers expressing quantities, properties, and so forth as used in the specification are to be understood as being modified in all instances by the term "about." Accordingly, unless otherwise indicated, the numerical properties set forth in the following specification are approximations that may vary depending on the desired properties sought to be obtained in embodiments of the present invention. Notwithstanding that the numerical ranges and parameters setting forth the broad scope of the invention are approximations, the numerical values to the extent that such are set forth in the specific examples are reported as precisely as possible. Any numerical values, however, inherently contain certain errors necessarily resulting from error found in their respective measurements.

FIGS. 1A-1G illustrate a composting container 100 according to one exemplary embodiment. Referring to FIGS. 1A-1G, the container 100 includes a body 102. The body 102 defines or forms a cavity 104 surrounded by four sidewalls 106. The sidewalls 106 extend between an upper surface or rim 108 of the body 102 and a lower surface or floor 110 of the body 102. At least a portion of the cavity 104 within the container 100 is suitable for receiving a quantity of organic material (not shown) for composting. The upper surface 108 of the body 102 defines an upper opening 112 which provides access to the cavity 104. The lower surface 110 of the body 102 forms a support surface for the container 100.

As configured, an outer surface or circumference of the body 102 of the illustrated embodiment presents a generally rectangular profile. In particular, the body 102 of the illustrated embodiment has a generally four-sided polygonal shape when viewed from the top (see FIG. 1C). In some exemplary embodiments, the body 102 could have fewer than or more than four sidewalls 106. In some exemplary embodiments, the body 102 could be shaped to have any desired profile, such as a cylindrical profile, oval profile, etc. In some exemplary embodiments, the body 102 has the dimensions and/or a profile approximating a conventional outdoor residential or municipal trash can. In some exemplary embodiments, the profile of the outer surface of the body 102 is different from a profile of an inner surface of the body 102 (i.e., a profile of the cavity 104).

The body 102 may be formed of one or more of a variety of suitable materials. The particular material is generally selected to be compatible with the intended contents and purpose and desired qualities of the body 102. For example, in some exemplary embodiments, the body 102 may be made from one or a combination of thermoplastic or elastomeric materials, such as plastic. In some exemplary embodiments, the body 102 may be made from one or a combination of metals, such as steel or aluminum.

The body 102 may be manufactured by any suitable method, including any one of a variety of methods of making containers that are well known in the art. For example, rotational, injection or blow molding processes could be used with any of a variety of thermoplastic and elastomeric materials. Accordingly, in some exemplary embodiments of the general inventive concepts, the body 102 may be made from one or a combination of thermoplastic or elastomeric materials, such as polyesters, Polycarbonate (PC), polypropylene (PP), polyethylene (PE), High Density Polyethylene (HDPE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, nylon 66, Polyethylene Terephthalate Modified with CHDM (PETG), and mixtures thereof.

The body 102 of the illustrated embodiment includes a handle 114 formed integrally therewith. In some exemplary embodiments, the handle 114 is a separate piece that is attached or otherwise fastened (e.g., using screws, bolts, rivets) to one or more portions of the body 102. In some exemplary embodiments, more than one handle is provided and in yet additional embodiments no handle is provided.

The body 102 of the illustrated embodiment also includes one or more wheels 116 or the like. The wheels 116 are connected to the body 102 by an axle 118 that extends through one or more holes 120 formed in the body 102. In some exemplary embodiments, the wheels 116 are connected by other means. In some exemplary embodiments, fewer than or more than two wheels are provided. In some exemplary embodiments, no wheels are present.

The handle 114 and/or the wheels 116 facilitate movement of the container 100 and its contents. The portability of the container 100 provided by the handle 114 and the wheels 116 can be beneficial to the composting effectiveness of the container 100. For example, keeping the container 100 sufficiently heated can increase the rate at which composting of the organic material occurs. Because a position of the sun's light varies over the course of the day and from season to season, the ability to readily move the container 100 to increase its exposure to this light can insure that adequate heat is provided to the container to promote the composting therein. The portability of the container 100 can also make the loading of the container easier for a user. For example, the container 100 can be moved to a location where organic material, such as grass clippings or leaves, are piled that a user wishes to load into the container 100.

The container 100 of the illustrated embodiment also includes a lid 122. The lid 122 is sized and/or shaped so as to cover the upper opening 112 of the body 102. The lid 122 includes hinges 124 that snap on or otherwise engage with the handle 114 of the body 102 or other portion of the container 100. In this manner, the lid 122 of the illustrated embodiment can pivot about the handle 114 between an opened position in which access to the cavity 104 through the upper opening 112 of the body 102 is possible and a closed position in which access to the cavity 104 through the upper opening 112 of the body 102 is prevented.

In some exemplary embodiments, the lid 122 is removably attached and/or secured to the body 102 using different means. For example, the lid 122 may be sized and/or shaped so as to form a friction fit with the body 102.

The lid 122 may be formed of one or more of a variety of suitable materials. For example, in some exemplary embodiments, the lid 122 may be made from one or a combination of thermoplastic or elastomeric materials, such as plastic. In some exemplary embodiments, the lid 122 may be made from one or a combination of metals, such as steel or aluminum. In some exemplary embodiments, the lid 122 is made of the same material as the body 102.

The lid 122 may be manufactured by any suitable method, including any one of a variety of methods of making such components that are well known in the art. For example, various molding processes, such as blow molding processes, could be used with any of a variety of thermoplastic and elastomeric materials. Accordingly, in some exemplary embodiments of the general inventive concepts, the lid 122 may be made from one or a combination of thermoplastic or elastomeric materials, such as polyesters, Polycarbonate (PC), polypropylene (PP), polyethylene (PE), High Density Polyethylene (HDPE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethyleneterephthalate (PET), polyvinylidenechloride, polymethylpentene-1, nylon 6, nylon 66, Polyethylene Terephthalate Modified with CHDM (PETG), and mixtures thereof.

As shown in FIG. 1A, a securing device, such as a lid latch 126, secures the lid 122 in the closed position. In this manner, only manipulation of the lid latch 126 allows the lid 122 to be moved from its closed position. Thus, the lid latch 126 prevents accidental or undesired opening of the container 100, such as might occur if the container 100 were to fall over or as a result of the force of the wind or an animal attempting to open the lid 122. With the lid 122 in a closed position, the cavity 104 forms an environment suitable for composting organic material.

Figure 1B:
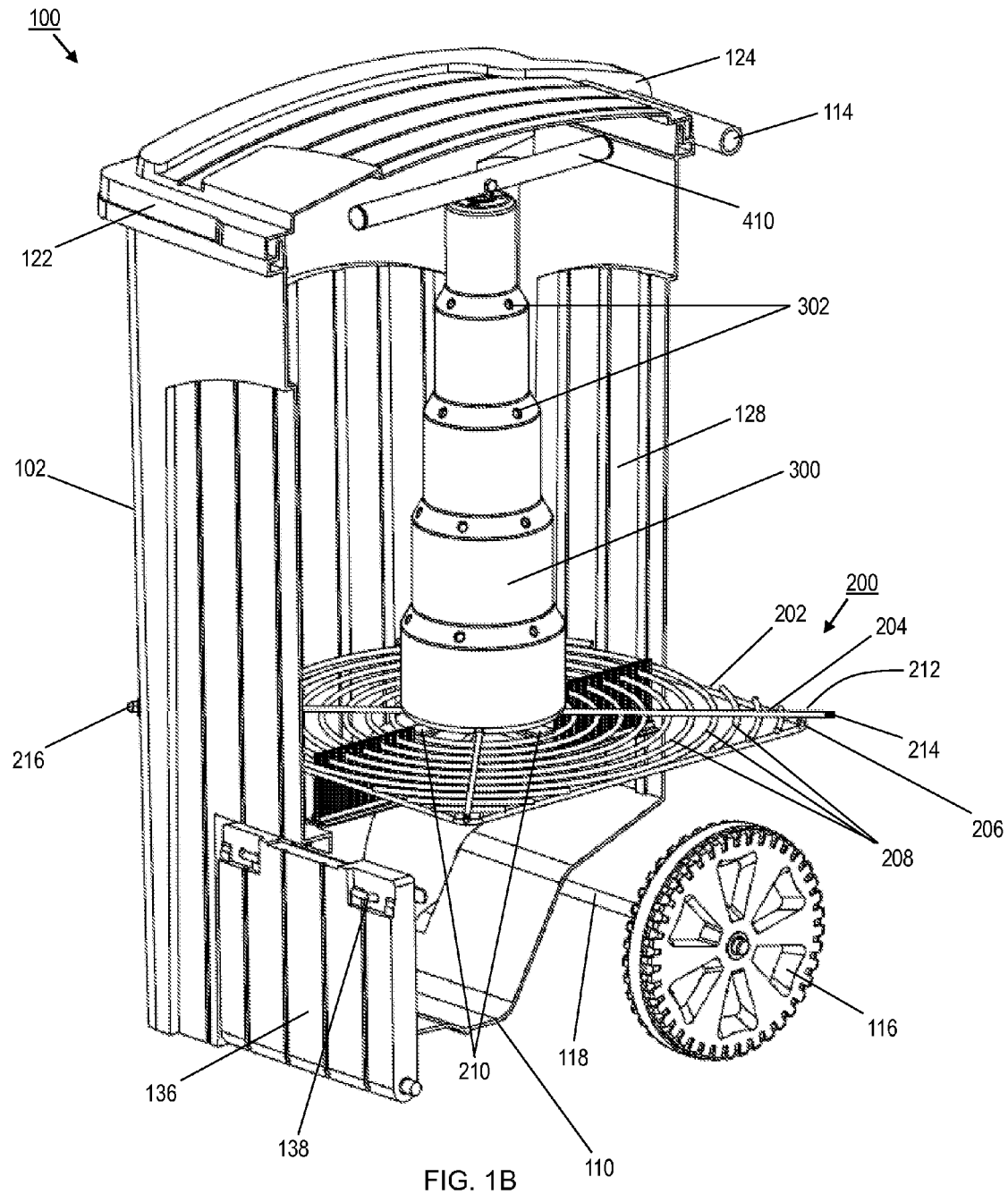
FIG. 1B is a cross-sectional view of the composting container of FIG. 1A, as viewed from a different perspective.
Figure 1C:
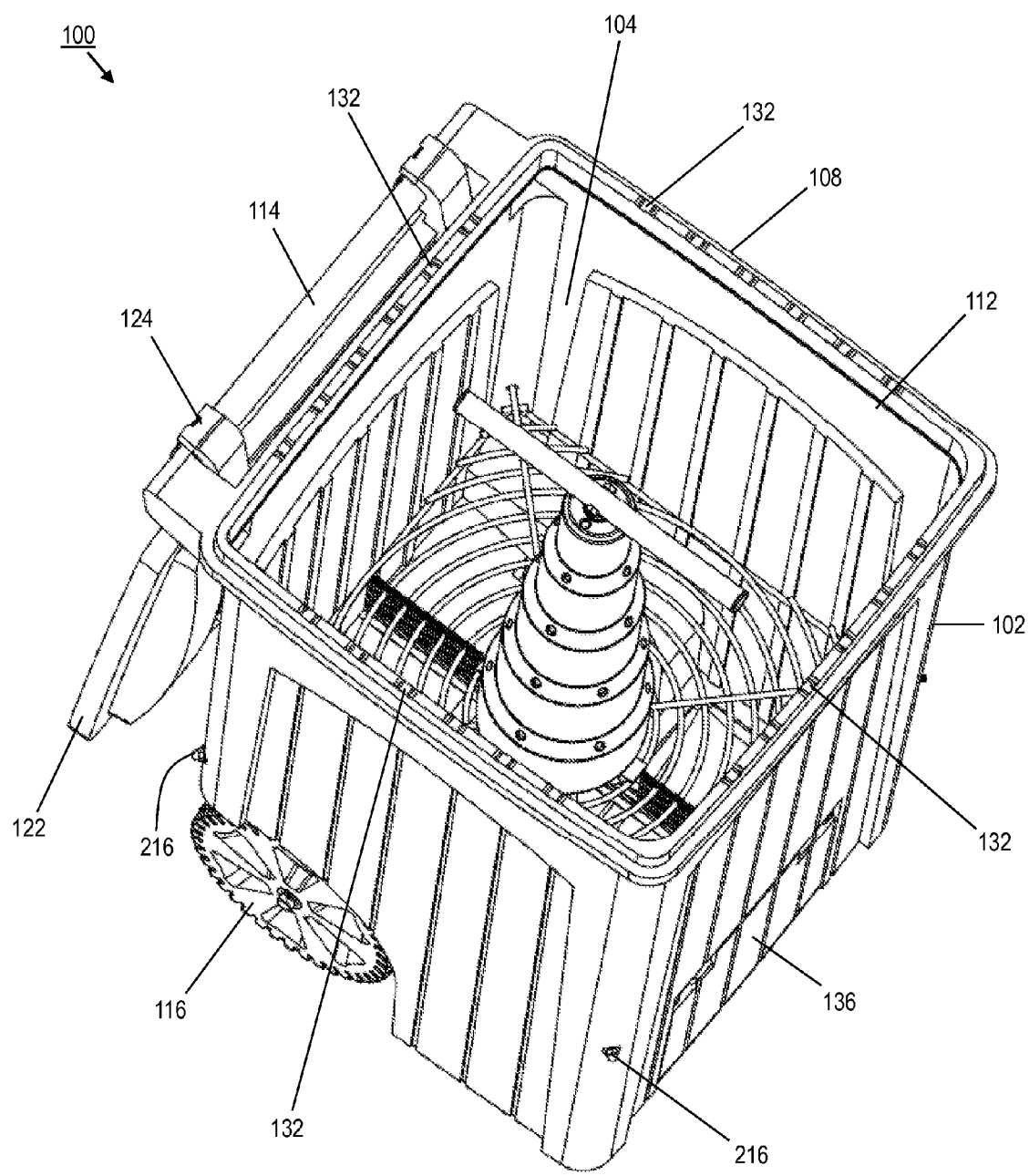
FIG. 1C is a perspective view of the composting container with the lid of the container in an opened position.
Figure 2:
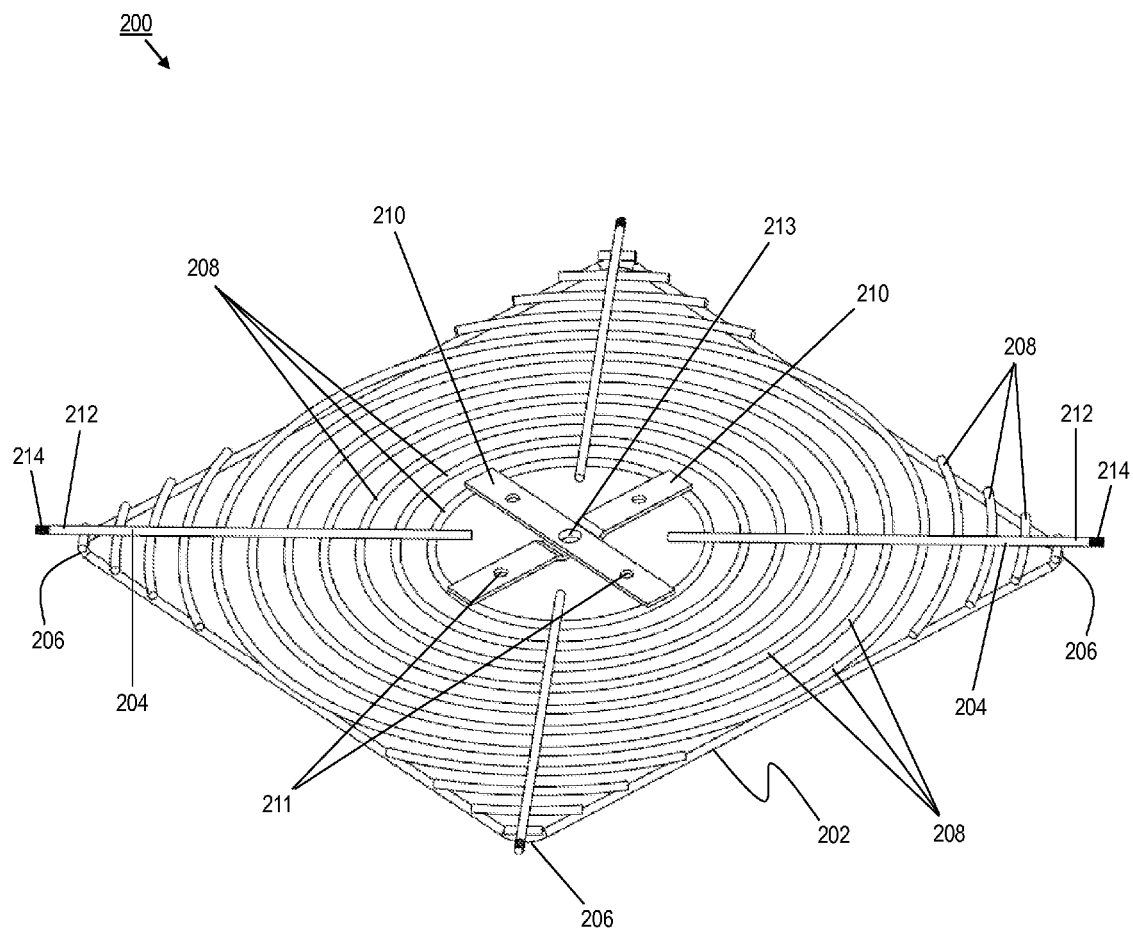
FIG. 2 is a perspective view of a grating for use in a composting container, such as the composting container illustrated in FIGS. 1A-1G, according to one exemplary embodiment.

As shown in FIGS. 1B-1C, the container 100 of the illustrated embodiment includes a grating 200 disposed within the cavity 104 of the body 102. As shown in FIG. 2, the illustrated embodiment of the grating 200 includes a frame 202 generally defining a profile of the grating 200. The frame 202 has four sides forming a generally square or rectangular profile. In some exemplary embodiments, the frame 202 could have fewer than or more than four sides. In some exemplary embodiments, the frame 202 could be shaped to have any desired profile, such as a circular, oval, or triangular shaped profile. In some exemplary embodiments, the profile of the frame 202 of the grating 200 is different from a profile of an inner surface of the body 102 (i.e., a profile of the cavity 104).

In the grating 200 of the illustrated embodiment, diagonal bars 204 are situated above the frame 202 and extend to, through, and/or near a center of the frame 202 and through each of the corners 206 of the frame 202. Curved and/or circular bars 208 are situated between the diagonal bars 204 and the frame 202 in an evenly spaced, concentric arrangement. Additionally, support bars 210 are positioned at or near the center of the frame 202 (see FIGS. 1B and 1F). The support bars 210 can be situated between the diagonal bars 204 and one or more of the curved bars 208. In various additional embodiments, the grating may include one or more bars, plates, elements or other surfaces arranged in a variety of configurations to provide one or more apertures through the grating. In yet additional embodiments, the grating may include one or more generally solid bodies with apertures or holes defined therethrough.

The various components of the grating 200 (e.g., the frame 202, the diagonal bars 204, the circular bars 208, the support bars 210) can be joined in any suitable manner. For example, the components could be welded together. In yet additional embodiments, the grating 200 may be made of several sections that are joined together to form the grating. For example, the grating could be made up of two or more rectangular sections that are combined to form a larger, rectangular shaped grating, or two or more semi-circular, quarter-circular, etc. portions that are combined to form a larger, circular or semi-circular shaped grating.

In some exemplary embodiments, the support bars 210 may have mounting holes 211 formed therein for securing a stack (e.g., the stack 300 described below) thereto, such as by fasteners (e.g., screws, bolts, rivets). In some exemplary embodiments, the support bars 210 may include a central aperture 213 or other opening sized to allow a portion of an agitator mechanism (e.g., the shaft 408 of the agitator mechanism 400 described below) to fit through the aperture 213.

A circumference of the frame 202 is selected to be close to but smaller than a circumference of the inner surface of the body 102 (i.e., the cavity 104). Thus, the grating 200 effectively separates the cavity 104 into an upper portion 128 and a lower portion 130, as shown, for example, in FIG. 1F. In some exemplary embodiments, the upper portion 128 of the cavity 104 is significantly larger than the lower portion 130 of the cavity 104. The grating 200 of the illustrated embodiment acts to hold larger organic material in the upper portion 128 of the cavity 104 while allowing smaller (e.g., more decomposed) organic material to pass through the grating 200 and into the lower portion 130 of the cavity 104 during the composting process. For example, the curved bars 208 of the grating 200 act to hold larger organic material in the upper portion 128 of the cavity 104 while allowing smaller organic material to pass through the grating 200. In some exemplary embodiments, different sized and/or shaped bars can be used to obtain different grating patterns.

The diagonal bars 204 of the grating 200 of the illustrated embodiment are used to secure the grating 200 to the body 102 of the container 100. However, it should be understood that the grating 200 may be secured to the body 102 of the container in a variety of different ways in alternative embodiments. For example, a ridge or lip may be defined within or extend from the interior of the body that the grating 200 rests upon. In the container 100 of the illustrated embodiment, an end portion 212 of each diagonal bar 204 is sized and/or shaped to extend through a corresponding hole (not shown) formed in the body 102. Thus, since there are four end portions 212 there are four holes formed in the body 102. For example, one hole can be formed in each corner of the body 102. In various additional embodiments, any number of end portions 212 and corresponding holes formed in the body 102 may be employed.

As the grating 200 of the illustrated embodiment is situated in the cavity 104 of the body 102, each end portion 212 extends through one of the holes such that at least a portion 214 of the end portion 212 extends outside the container 100 beyond the outer surface of the body 102. The portion 214 of each end portion 212 visible from outside the container 100 includes threads which allow for a threaded cap 216, nut or the like to be screwed thereon. In this manner, the grating 200 is securely fastened to the body 102 such that the grating 200 is fixed within the cavity 104. However, as mentioned previously, it should be understood that the grating 200 may be mounted to the body in any variety of suitable ways. In addition, in various additional embodiments, the grating 200 may be formed integrally as a one-piece construction with the body 102 of the container.

Figure 3:
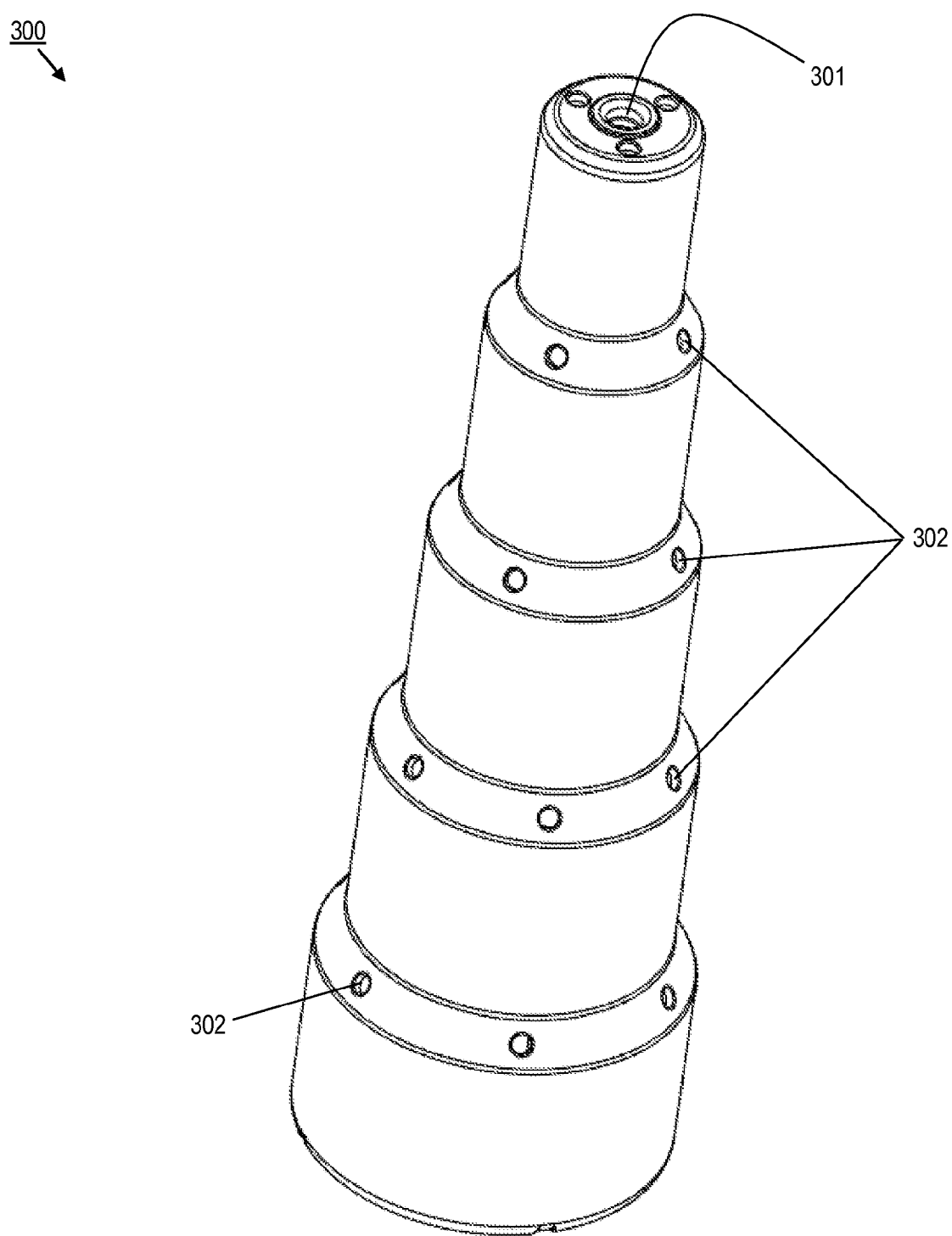
FIG. 3 is a perspective view of a stack for use in a composting container, such as the composting container illustrated in FIGS. 1A-1G, according to one exemplary embodiment.

In the exemplary illustrated embodiment of container 100, the support bars 210 of the grating 200 provide a support surface on which a stack 300 can be situated (see FIG. 3). The stack 300 is a hollow member that rests on the grating 200 and extends above the grating 200 toward the upper surface 108 of the body 102. The height of the stack 300 of the illustrated embodiment is such that it terminates near the upper opening 112 of the body 102. In some exemplary embodiments, the stack 300 is affixed to the grating 200, for example, by fasteners (e.g., screws, bolts, rivets) extending through both the mounting holes 211 in the support bars 210 of the grating 200 and corresponding mounting holes (not shown) in a lower surface of the stack 300. In additional exemplary embodiments, the stack 300 may be integrally formed with the grating 200 or a portion of the grating. In yet additional exemplary embodiments, the stack 300 may be affixed to or integrally formed with a portion of the body 102, such as the floor 110.

The stack 300 of the illustrated embodiment has a tiered shape such that its upper tiers or levels have a smaller circumference than its lower tiers or levels. In some exemplary embodiments, the stack 300 has a non-tiered shape. In some exemplary embodiments, the stack 300 has a substantially uniform circumference across its height. In various embodiments, no stack 300 is provided.

Figure 4:
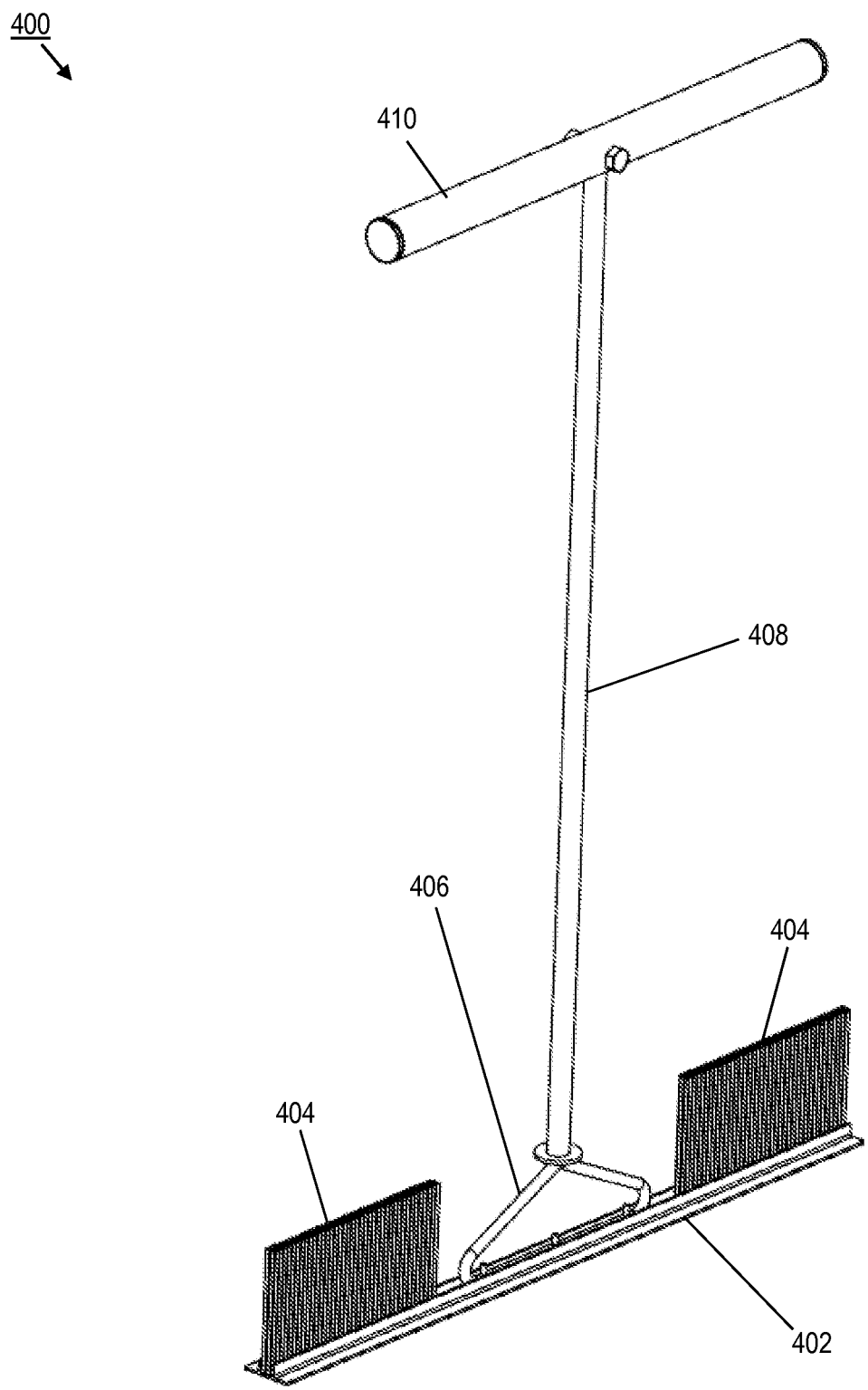
FIG. 4 is a perspective view of an agitator mechanism for use in a composting container, such as the composting container illustrated in FIGS. 1A-1G, according to one exemplary embodiment.

The stack 300 of the illustrated embodiment partially encloses an agitator mechanism 400 (see FIG. 4). Thus, the stack 300 is a hollow member having a central opening 301 or conduit sized to accommodate a shaft 408 or other portion of the agitator mechanism 400 as described below. In this manner, the shaft 408 of the agitator mechanism 400 can freely rotate within the stack 300. However, in additional embodiments, the agitator mechanism 400 may not be received within the stack 300. Rather, in such embodiments, the stack 300 and agitator mechanism 400 may be separate from one another and the agitator mechanism is not received within the stack and does not interact or engage with the stack in any fashion.

A variety of different types of agitator mechanism 400 may be provided with various embodiments of the container 100. The agitator mechanism of various embodiments of the container are selectively operable and serve to agitate or otherwise move, stir, shift, disturb, disrupt or displace the material in the cavity to urge or otherwise assist the material in passing through the grating 200. As the material within the container 102 decomposes it breaks down into smaller pieces allowing it to pass through the grating 200 and enter the lower portion 130 of the cavity where it is then gathered for use as compost. However, due to larger particles that have not yet become sufficient decomposed resting on the grating or other blockages, pieces of decomposed organic matter may not fall through the grating 200 as a result of gravitational forces alone. The agitator mechanism 400 serves to agitate or otherwise move, stir, shift, disturb, disrupt or displace the material in the cavity and/or the material on the grating 200 itself to assist any material to pass through the grating that has sufficiently decomposed to break down to a size that is able to fit through the apertures defined within the grating. The interaction of the agitator mechanism itself with the organic material may even serve to assist in breaking up the organic material into smaller pieces that can then pass through the grating 200.

The agitator mechanism of various embodiments may have a variety of configurations and constructions. The agitator mechanism may be a one piece construction or a multi-piece construction made up of more than one constituent parts. The agitator mechanism may be a device, at least a portion of which moves within the container 100 to agitate or otherwise move, stir, shift, disturb, disrupt or displace the material in the container 100. For example, the agitator mechanism may include a portion that extends into the a cavity 104 and agitates the material in the a cavity 104. In yet additional embodiments, the agitator mechanism may include one or more elements that contact the grating 200 or pass through the apertures or holes defined within the grating to assist material in falling through the grating 200. In various additional embodiments, the grating 200 itself may serve as the agitator mechanism. For example, the grating 200 may be comprised of two or more grating layers that overlay one another and are capable of movement relative to one another. The movement of the grating layers relative to one another may serve to agitate the material resting upon the grating and cause some or all of the material to fall through the grating.

The agitator mechanism of various embodiments may be manually operated. In yet additional embodiments an automated agitator mechanism may be provided that is electronically activated or otherwise driven by a powered mechanism. In various embodiments, more than one agitator mechanism may be provided.

In the illustrated embodiment, the agitator mechanism 400 includes a base 402 with a pair of brushes 404 situated at opposite ends of the base 402. Each brush 404 comprises a plurality of bristles and extends substantially perpendicular to the base, such that the bristles of the brushes 404 point toward the upper opening 112 of the container 100. In some exemplary embodiments, the base 402 includes another mechanism (e.g., a blade, tined fork, plurality of projections, etc.), instead of brushes 404, for extending upward in the cavity. In yet additional embodiments, the agitator mechanism may include elements that point downwardly toward the floor 110 of the container as opposed to upwardly towards the upper opening 112.

A connector 406 of the illustrated embodiment of the agitator mechanism 400 connects the shaft 408 to the base 402 such that the shaft 408 extends substantially perpendicular to the base 402 and points toward the upper opening 112 of the container 100.

A handle 410 is connected to the shaft 408, such as by a fastener (e.g., screw, bolt, rivet). In some exemplary embodiments, the handle 410 is formed integrally with the shaft 408. The handle 410 extends substantially perpendicular to the shaft 408 and substantially parallel to the base 402. However, it should be understood that the agitator assembly may have a wide variety of suitable shapes, configurations and constructions in various additional embodiments.

Figure 1D:
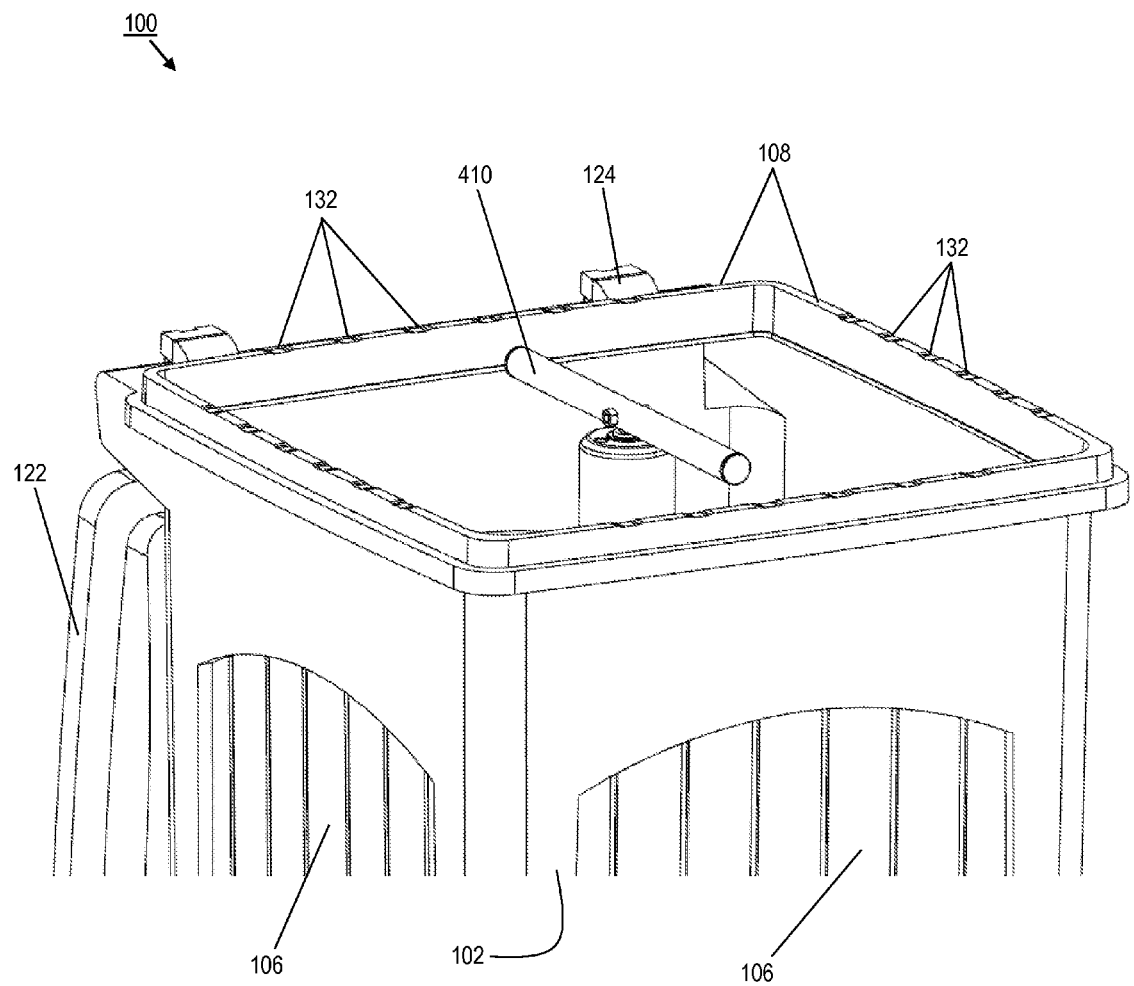
FIG. 1D is a close-up, partial view of the composting container of FIG. 1A, as viewed from a different perspective.
Figure 1E:
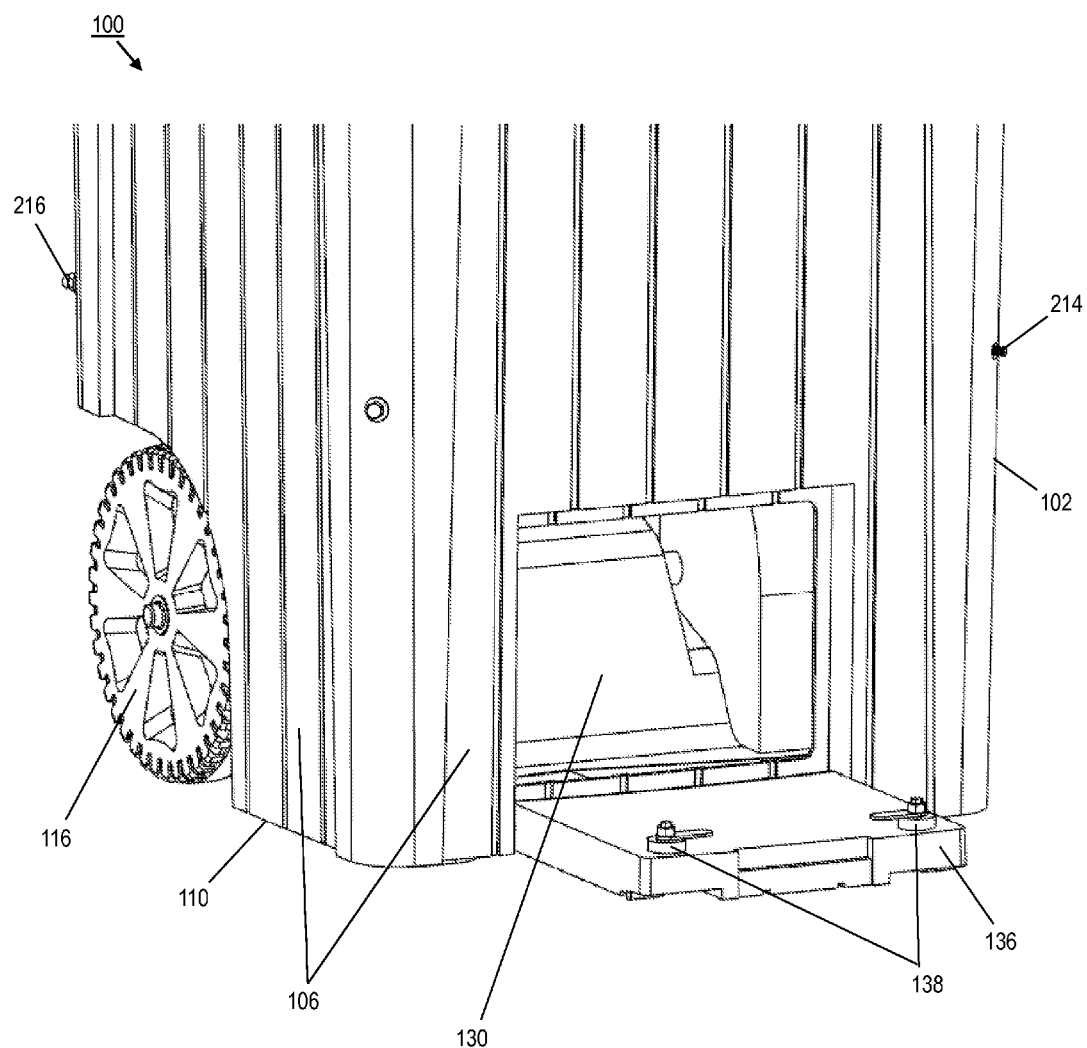
FIG. 1E is another close-up, partial view of the composting container of FIG. 1A, as viewed from a different perspective.
Figure 1F:
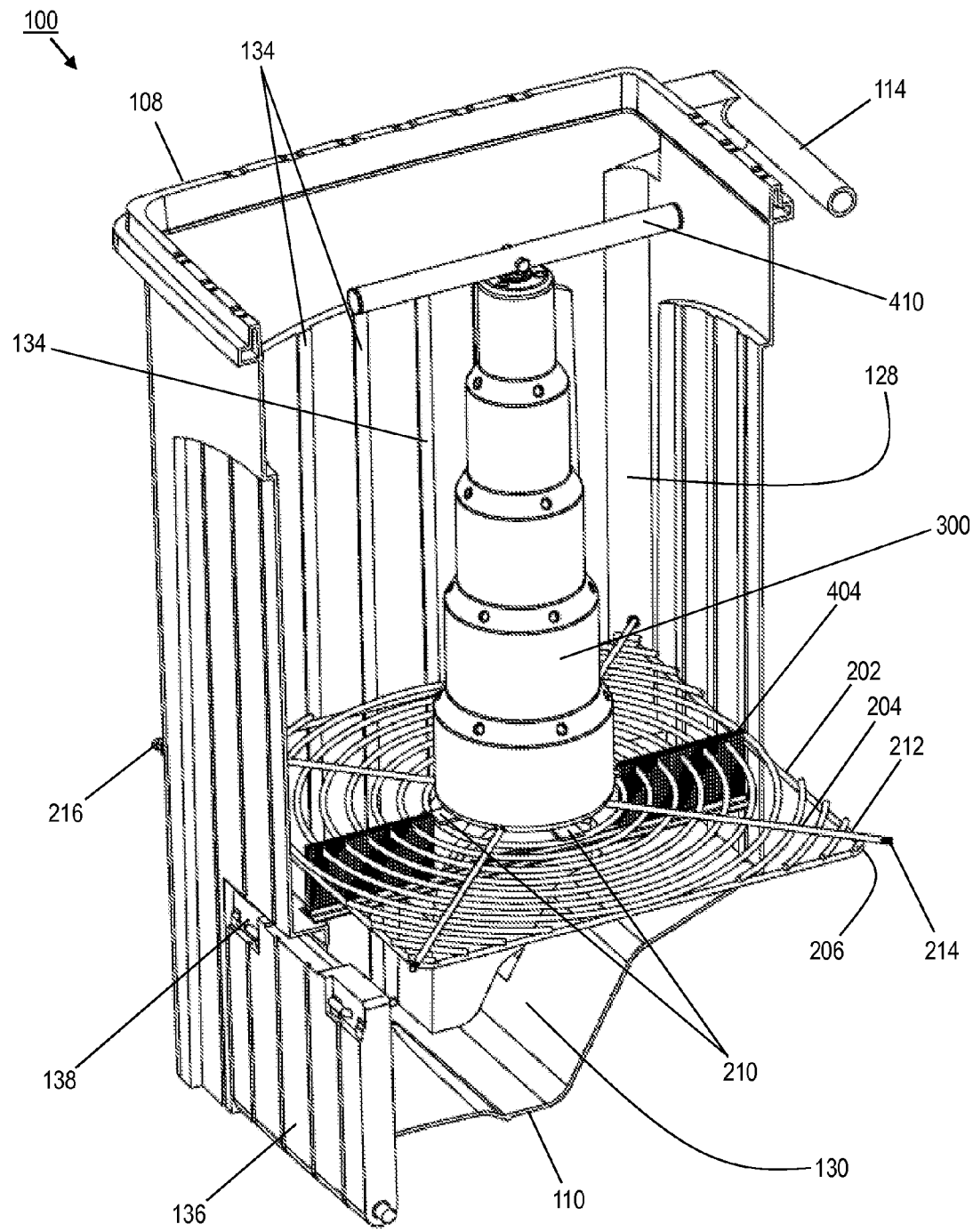
FIG. 1F is a perspective, cross-sectional view of the composting container of FIG. 1A without the lid.

A portion of the illustrated embodiment of the agitator mechanism 400, particularly the shaft 408, is enclosed by the stack 300 (see FIGS. 1B and 1F). In some exemplary embodiments, the agitator mechanism 400 itself fixes the stack 300 in place. As configured, the handle 410 is situated above the stack 300, while the base 402 and the connector 406 are situated below the stack 300. The base 402 and the connector 406 are also situated below the grating 200 in this configuration. In the illustrated embodiment of the agitator mechanism 400, at least a portion (e.g., the tips) of the bristles of the brushes 404 extend through the grating 200 and into the upper portion 128 of the cavity 104 of the body 102 (see FIGS. 1B and 1F).

With the agitator mechanism 400 in place in the container 100, the handle 410 is situated near the upper opening 112 of the body 102 (see FIGS. 1C and 1D). In this manner, a user can readily access and manipulate the handle 410 through the upper opening 112 of the container 100 when the lid 122 is in the opened position. While the agitator mechanism of the illustrated embodiment is located centrally within the container 100 and coincident to the longitudinal axis of the container and configured for rotational movement within the container, it should be understood that various additional embodiments of the container 100 may include agitator mechanism that are located centrally within the container and coincident with the longitudinal axis of the container, but configured for movement in a reciprocating manner vertically up and down within the container. Also, additional containers 100 may include an agitator mechanism that is not located centrally within the container and coincident to the longitudinal axis of the container. For example, additional embodiments of the container may include an agitator mechanism mounted through one or more of the sidewalls 106 of the container for reciprocal or rotational movement within the container 100.

It is known that air circulation is an important element in promoting decomposition of organic materials during composting processes, as many of the organisms responsible for the decomposition require air to survive. Accordingly, the container 100 includes structural features that either passively and/or actively facilitate the aeration of organic material being composted within the container 100. As a result, the container 100 is able to increase the rate at which composting of the organic material occurs.

For example, the upper surface 108 of the body 102 is at least partially notched with recesses 132 that prevent the interface between the lid 122 and the body 102 from being airtight (see FIGS. 1C-1D). In this manner, air can flow into the cavity 104 within the container 100 even when the lid 122 is secured to the body 102. In additional embodiments, the lid 122 may include apertures or holes defined therethrough to permit airflow into the container 100.

Figure 1G:
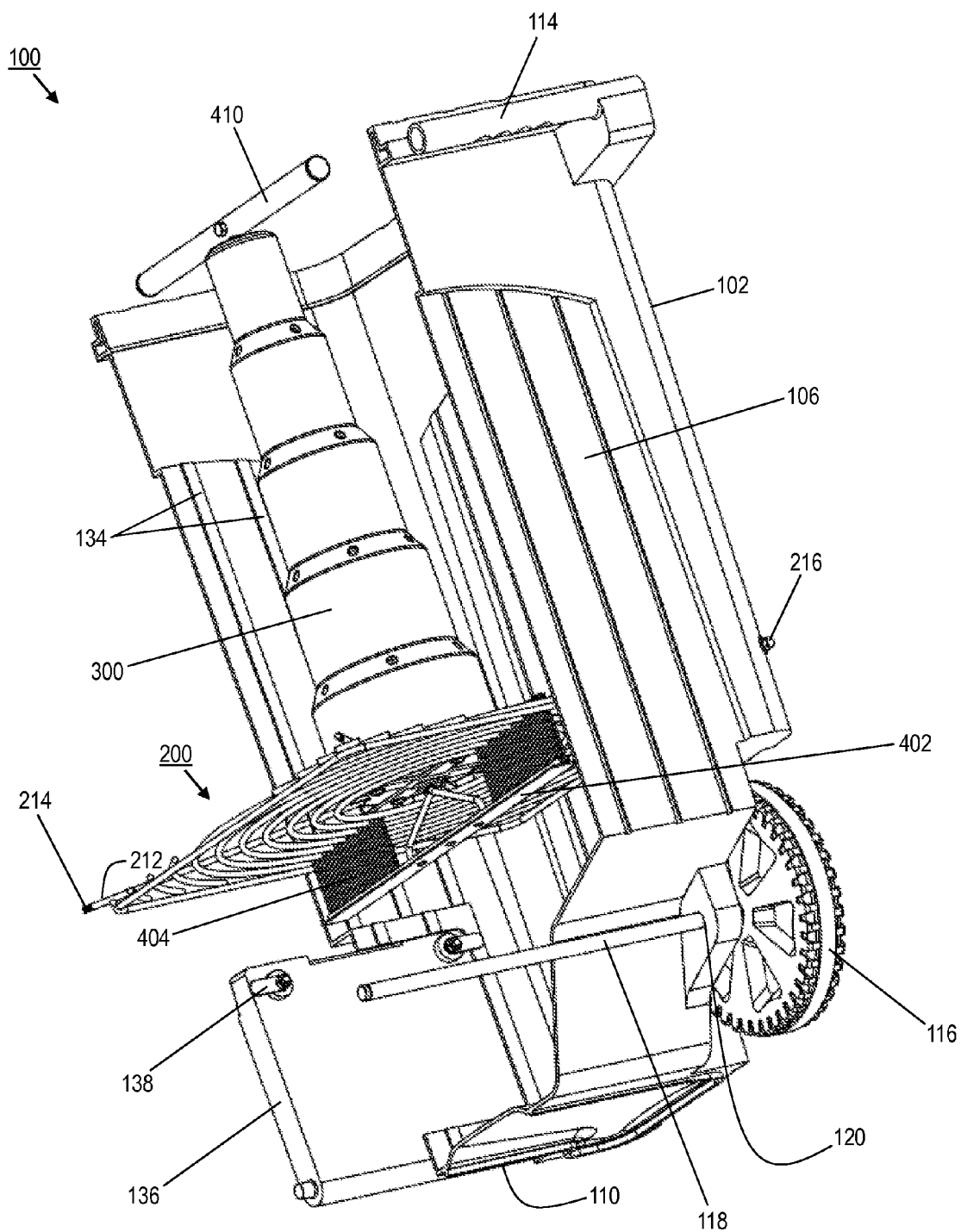
FIG. 1G is another cross-sectional view of the composting container of FIG. 1A without the lid, as viewed from a different perspective.

Furthermore, at least a portion of the inner surface of the cavity 104 of the body 102 can be fluted by having grooves 134 that extend along some length of the cavity 104 of the body 102 (see FIGS. 1F-1G). Again, these grooves 134 allow air entering the cavity 104, such as near the upper surface 108 of the body 102, to flow through the cavity 104, such as downward toward the lower surface 110 of the body 102 (and vice versa). In this manner, air can be delivered to the pile of organic material situated in the container 100.

Use of the grating 200 also contributes to air flow through the cavity 104 of the body 102 by keeping the pile of organic material lifted off of the bottom surface 110 of the body 102. Thus, the space (e.g., pocket) formed in the lower portion 130 of the cavity 104 can be occupied at least in part by air entering the container 100 (e.g., via the aforementioned recesses 132).

In some exemplary embodiments, the stack 300 can have apertures 302 formed therein to promote a more even flow of air through the pile of organic material in the cavity 104 (see FIG. 1B). Such apertures 302 in the stack 300 provide other benefits as well, such as a means to regulate temperature variations in the pile of organic material occupying the cavity 104.

In some exemplary embodiments, the body 102 itself can have apertures (not shown) formed therethrough to promote air flow into the cavity 104. In some exemplary embodiments, a plurality of apertures are formed near the lower surface 110 of the body 102. Such apertures may provide other benefits too, such as providing a means for excess water in the cavity 104 to drain out.

Additionally, the agitator mechanism 400 provides another mechanism for promoting air distribution throughout the pile of organic material in the container 100. In particular, with the agitator mechanism of the illustrated embodiment, rotation of the handle 410 by the user causes the base 402 and its brushes 404 to rotate in a corresponding direction (e.g., clockwise). In some exemplary embodiments, the movement of the handle 410 is non-rotational (e.g., rocking, sliding) and translates into non-rotational movement of the base 402 and its brushes 404. This movement of the brushes 404 causes the portion of the bristles extending into the upper portion 128 of the cavity 104 to interact with (e.g., agitate, stir, displace) the organic material in the upper portion 128 of the cavity 104. In some configurations, this agitation could result in partial or complete rearrangement of the pile of organic material, such that delivery of air to different parts of the pile are facilitated.

As noted above, the grating 200 acts to filter the smaller, finer, or otherwise more decomposed parts of the organic material resulting from the composting processes from the larger, coarser, or otherwise less decomposed parts of the organic material being composted. That is, most if not all of the organic material is initially situated in the upper portion 128 of the cavity 104 within the container 100. Over time, as decomposition of the organic material occurs, the organic material is broken down into finer material that can pass through the grating 200.

Operation of the agitator mechanism 400 also provides a mechanism which facilitates collection of this finer material, which is typically the more desired compost material. For example, by "brushing" or otherwise contacting at least a bottom portion of the pile of organic material, the brushes 404 of the agitator mechanism 400 aid the finer material in passing through the grating 200 where it collects in the lower portion 130 of the cavity 104 within the container 100. In this manner, gravity need not be the only force relied upon in urging the finer material to pass through the grating 200.

Since the desired compost material is in the bottom of the container 100, it would not typically be accessible without disturbing (e.g., removing) the organic material situated above it in the container 100, which could negatively disrupt the ongoing decomposition of the material. Furthermore, such an endeavor would be laborious and potentially messy.

Accordingly, the body 102 of the container 100 includes a lower door 136 that provides direct access to the lower portion 130 of the cavity 104 where the desired compost material collects (see FIGS. 1A-1B and 1E). A door latch 138 secures the lower door 136 to the body 102 in a closed position. In this manner, only manipulation of the door latch 138 allows the lower door 136 to be moved from its closed position to an opened position. Thus, the door latch 138 prevents accidental opening of the lower door 136 and inadvertent spillage of the compost material.

Furthermore, because the container 100 is readily portable by virtue of its wheels 116, the user can move the container 100 to a desired location (e.g., a garden) before opening the lower door 136 to access the compost material. The user could also use the handle 114 on the container 100 to tilt the container 100 with the lower door 136 in its opened position for controlled delivery of the compost material at the desired location.

While the general inventive concepts have been illustrated by the description of exemplary embodiments thereof, and while the exemplary embodiments have been described in considerable detail, it is not the intention of the applicants to restrict or in any way limit the scope of the general inventive concepts to such details. Additional advantages and modifications will readily appear to those skilled in the art. For example, where components are releasable or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the general inventive concepts, in their broader aspects, are not limited to the specific details, the representative apparatus, and illustrative examples shown and described. Accordingly, departures may be made from such details without departing from the spirit or scope of the applicant's general inventive concepts.

Furthermore, while various inventive aspects, concepts and features of the general inventive concepts may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the general inventive concepts may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of the general inventive concepts, such identification is not intended to be exclusive, but rather there may be inventive aspects, concepts and features that are fully described herein without being expressly identified as such or as part of the general inventive concepts. Any descriptions of exemplary methods or processes are not limited to inclusion of all steps as being required in all cases, nor is the order that the steps are presented to be construed as required or necessary unless expressly so stated.

The invention claimed is:

1. A composting container comprising:
   a body defining a cavity for receiving material to be composted;
   a lid for covering an opening in said body exposing said cavity;
   a grating situated in said cavity, said grating dividing said cavity into an upper portion and a lower portion;
   an agitator mechanism for agitating the material in said cavity, wherein said agitator mechanism comprises:
     a handle;
     a base;
     at least one brush disposed on an end of said base; and
     a shaft connecting said handle to said base and extending through said grating, wherein said agitator mechanism is at least partially disposed within said cavity, wherein said base of said agitator mechanism is located in said lower portion of said cavity, wherein at least a portion of said brush extends through said grating and into said upper portion of said cavity, and wherein movement of said handle causes said base to move within said cavity; and
   a stack which extends between said opening in said body and said grating.

2. The composting container of claim 1, wherein said at least one brush comprises a pair of brushes, and wherein each said brush is disposed on an opposite end of said base.

3. The composting container of claim 1, wherein said stack at least partially encloses said agitator mechanism.

4. The composting container of claim 1, wherein said stack includes a plurality of tiers.

5. The composting container of claim 1, wherein said stack includes a plurality of apertures.

6. The composting container of claim 1, wherein rotation of said handle causes said base and said brush to rotate.

7. The composting container of claim 1, wherein an upper surface of said body surrounding said opening includes a plurality of recesses, and wherein said recesses remain exposed to ambient air when said lid covers said opening in said body.

8. The composting container of claim 1, wherein an inner surface of said body includes a plurality of grooves, and wherein at least a first portion of each groove is located in said upper portion of said cavity and at least a second portion of each groove is located in said lower portion of said cavity.

9. The composting container of claim 1, wherein said body has a plurality of apertures formed therein.

10. The composting container of claim 1, further comprising a lower door for covering a lower opening exposing said lower portion of said cavity.

11. The composting container of claim 10, wherein said body comprises a door latch for securing said lower door to said body in a closed position.

12. The composting container of claim 1, further comprising a container handle.

13. The composting container of claim 1, further comprising a pair of wheels which facilitate movement of the container.

14. A composting container comprising:
   a body defining a cavity for receiving material to be composted;
   a lid for covering an opening in said body exposing said cavity;
   a grating situated in said cavity, said grating dividing said cavity into an upper portion and a lower portion;
   an agitator mechanism for agitating the material in said cavity, wherein said agitator mechanism comprises:
      a handle;
      a base;
      at least one brush disposed on an end of said base; and
      a shaft connecting said handle to said base and extending through said grating, wherein said agitator mechanism is at least partially disposed within said cavity, wherein said base of said agitator mechanism is located in said lower portion of said cavity, wherein at least a portion of said brush extends through said grating and into said upper portion of said cavity, and wherein movement of said handle causes said base to move within said cavity;
   a stack which extends between said opening in said body and said grating;
   a lower door for covering a lower opening exposing said lower portion of said cavity;
   a container handle; and
   a pair of wheels which facilitate movement of the container.

15. The composting container of claim 14, wherein said at least one brush comprises a pair of brushes, and wherein each said brush is disposed on an opposite end of said base.

16. The composting container of claim 14, wherein said stack at least partially encloses said agitator mechanism.

17. The composting container of claim 14, wherein rotation of said handle causes said base and said brush to rotate.

18. The composting container of claim 14, wherein an upper surface of said body surrounding said opening includes a plurality of recesses, and wherein said recesses remain exposed to ambient air when said lid covers said opening in said body.

19. The composting container of claim 14, wherein an inner surface of said body includes a plurality of grooves, and wherein at least a first portion of each groove is located in said upper portion of said cavity and at least a second portion of each groove is located in said lower portion of said cavity.

20. The composting container of claim 14, wherein said body has a plurality of apertures formed therein.

* * * * *